Oct. 16, 1951  D. B. ALEXANDER  2,571,179
CENTRIFUGAL PUMP AND TURBINE REVERSIBLE FLUID TRANSMISSION
Filed Feb. 13, 1947  2 Sheets-Sheet 1

INVENTOR.
DAVID B. ALEXANDER
BY Joshua R H Potts
HIS ATTORNEY

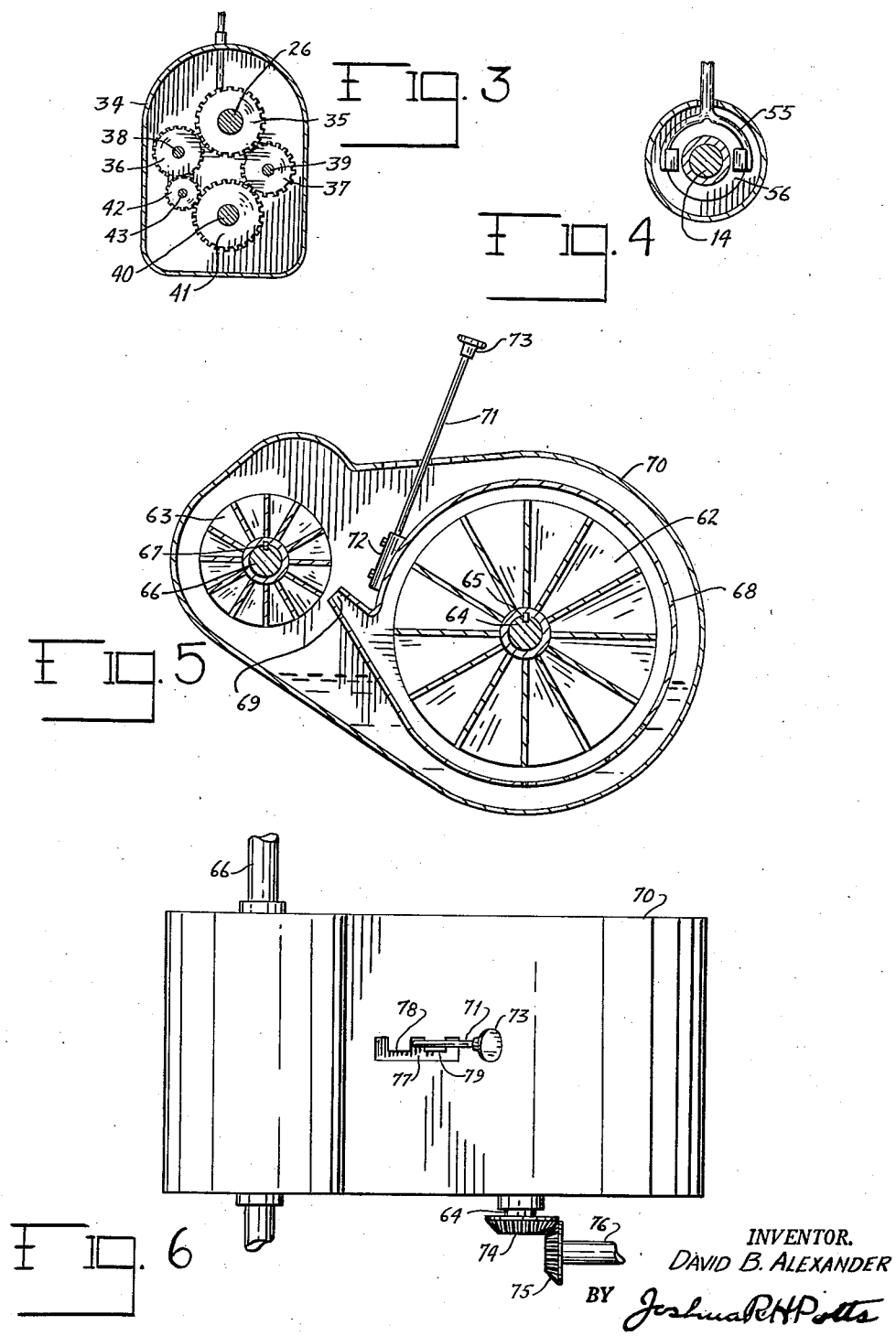

Patented Oct. 16, 1951

2,571,179

UNITED STATES PATENT OFFICE 2,571,179

CENTRIFUGAL PUMP AND TURBINE REVERSIBLE FLUID TRANSMISSION

David B. Alexander, Pottstown, Pa.

Application February 13, 1947, Serial No. 728,322

4 Claims. (Cl. 60—54)

This invention relates to a device for transmitting power from an engine, motor, or the like to a driven shaft or the like that may have wheels thereon, such as the wheels of a motor vehicle, and in particular includes a driving rotor having vanes in the peripheral surface and a smaller driven rotor also having vanes in the peripheral surface, wherein the rotors are rotatably mounted in a common housing with a drum-shaped enclosure having a discharge orifice provided around the driving rotor. The driving rotor is actuated by an engine or motor, and the driven rotor is associated with the driving wheels of a motor vehicle or the like.

The purpose of the invention is to transfer power from a positive source such as a motor engine or the like to operating elements of a machine or the like without a direct connection between the power source and machine.

In the usual type of fluid drive, valves or other devices are required to regulate the flow of fluid in order to change the speed of a rotated element or regulated passages are used between the impellers or driving and driven units, and these require comparatively complicated operating instrumentalities.

Certain applications for fluid drive transmissions present a variety of operating conditions and problems which the usual types are not capable of meeting successfully, taken alone. For example, an automotive vehicle requires both torque multiplication and unit ratio transmission characteristics. Thus it has heretofore been customary to employ mechanical transmission devices in conjunction with a fluid coupling or converter in automotive applications, to satisfy the different requirements. However, these combined hydraulic-mechanical devices are too expensive for use on vehicles in the medium and low price classes, are objectionably complicated and therefore difficult to repair, and the operation of the mechanical devices introduces operating characteristics which may detract from or counteract the advantageous features, such as the smoothness of operation, of the fluid coupling.

The primary object of this invention is to provide a fluid drive transmission which overcomes the deficiencies, limitations and objections above mentioned and satisfies the requirements for automotive application.

Another object of the invention is to provide a fluid actuated transmission device in which the direction of rotation of a driven element may readily be reversed.

Another object of this invention is to provide a fluid transmission device that is adapted for use in substantially all types of motor vehicles.

A further object of the invention is to provide a fluid transmission particularly adapted for use in motor vehicles and the like, which is of a comparatively simple and economical construction.

More in detail, the invention embodies a driving rotor geared to an engine or motor of a motor vehicle surrounded by a drum with a discharge orifice in one side and inlet openings in the other, a driven rotor positioned in the path of discharge of the orifice of the drum of the driving rotor, a housing enclosing the rotors and drum, and means gearing the driven rotor to a machine, wheels of a motor vehicle, or the like.

For a full and more complete understanding of the invention, reference may be had to the following description and accompanying drawings, wherein:

Figure 3 is a view showing a section on line 3—3 of Figure 2 illustrating the driving and reversing gears associated with the driven rotor.

Figure 4 is a cross-section on line 4—4 of Figure 2 illustrating a clutch actuating lever.

Figure 5 is a longitudinal section similar to that shown in Figure 1 showing a modification wherein means is provided for reversing the direction of rotation of the driven rotor.

Figure 6 is a plan view of the transmission unit as shown in Figure 5 showing a power shaft adapted to extend to a motor and a driven shaft on the outer ends of which the wheels of a motor vehicle may be positioned.

Figure 1:
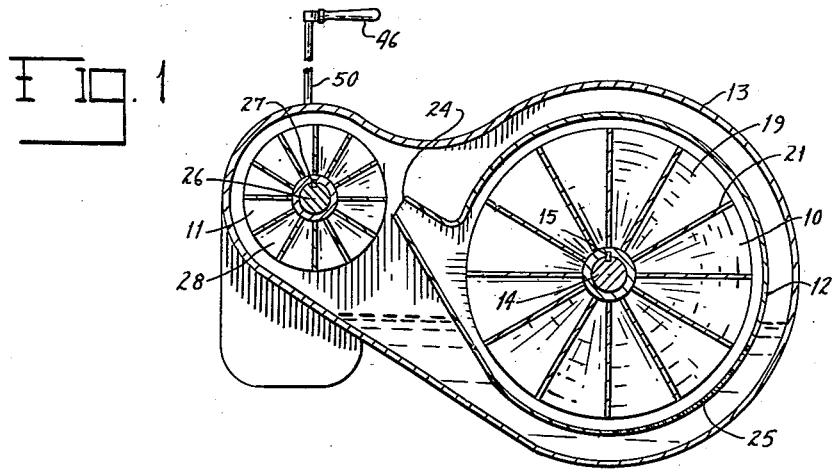
Figure 1 is a view showing a longitudinal section through the housing, drum, and rotors.

Referring now to the drawings, as shown in Figures 1 to 4, inclusive, the transmission unit of this invention includes an impeller or driving rotor 10, a driven rotor 11, a drum 12, a housing 13, and suitable driving and driven gear connections through which power may be applied to the unit and utilized therefrom.

Figure 2:
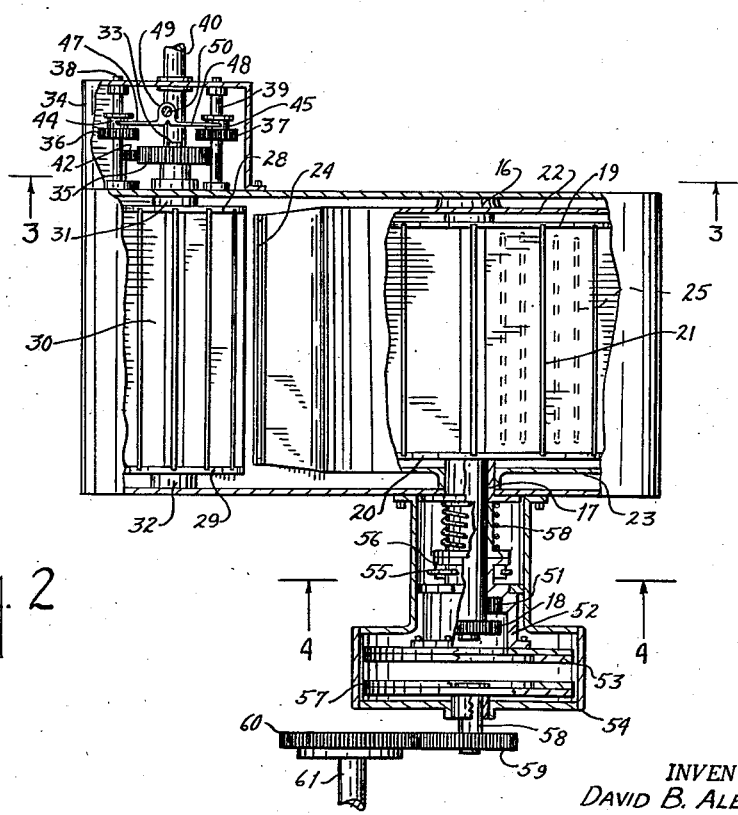
Figure 2 is a plan view of the transmission unit with parts of the housing and drum broken away and with parts shown in section.

In the design shown in Figures 1 and 2, the rotor 10 is keyed to a shaft 14 by a key 15, and the shaft is rotatably mounted through suitable bearings 16 and 17 in the housing 13 with one end of the shaft extending through the housing and provided, at the outer end, with a gear 18.

The driving rotor is provided with end plates 19 and 20 with blades 21 fixedly mounted between the end plates, and the ends of the blades are spaced from the inner surface of the drum 12, which is also provided with end plates, as indicated by the numerals 22 and 23. The drum is stationary in the housing, being positioned on the hubs 16 and 17, and at one side is a discharge orifice 24 which extends substantially throughout the width thereof. The lower surface of the drum is provided with elongated inlet slots 25 through which fluid in the housing is drawn into the drum as the rotor 10 rotates.

The driven rotor 11 is keyed on a shaft 26 by a key 27, and this is provided with end plates 28 and 29 in which the ends of the blades 30 thereof are fixedly held. The shaft 26 on which the driven rotor 11 is mounted is rotatably mounted in the housing 13 through bearings 31 and 32, and, in the design shown, one end 33 of the shaft extends outward into a gear housing 34.

As shown in Figures 2 and 3, a gear 35 is fixedly mounted on the end 33 of the shaft 26, and this gear is positioned to mesh with gears 36 and 37 on stub shafts 38 and 39, the gear 37 being adapted to drive a shaft 40 in one direction through a gear 41 below the gear 35 and mounted on the shaft 40; and the gear 36 driving the shaft 40 in the opposite direction through an intermediate idler gear 42 on a stub shaft 43. The gears 36 and 37 are provided with clutch collars 44 and 45, and through these collars, the gears are influenced to travel on the shafts 38 and 39 by a handle 46 which actuates yokes 47 and 48 at the ends of a rocker arm 49 on the lower end of a vertical rod 50.

By turning the handle 46 in one direction, the yoke 48 will slide the gear 37 on the shaft 39 until it meshes with the gear 35, so that it will drive the gear 41, and as the handle 46 is actuated in the opposite direction, it will withdraw the gear 37 and slide the gear 36 into mesh with the gears 35 and 42, wherein the gear 41, meshing with the gear 42, will be driven in the opposite direction.

The shaft 14 of the driving rotor 10 is rotated through the gear 18 at the end thereof which is positioned to mesh with an internal gear 51 in a sleeve 52 of a clutch element 53 in a clutch housing 54 positioned at one side of the housing 13. The clutch element 53 is actuated by a yoke 55 on a clutch collar 56 thereof and is urged to contact a corresponding clutch element 57 by a spring 58. It will be noted that in travelling on the shaft 14, the clutch element 53 first moves to such a position that the gears 18 and 51 mesh, and then the elements 53 and 57 contact. The clutch element 54 is mounted on a shaft 58 having a gear 59 on the outer end and the gear 59 meshes with a gear 60 that may be positioned on a shaft 61 extending from a motor, engine, or the like.

In the design shown in Figures 5 and 6, the device is provided with rotors 62 and 63 similar to the rotors 10 and 11, and in this design the rotor 62 is keyed to a shaft 64 by a key 65, and the rotor 63 is keyed to a shaft 66 by a key 67. The rotor 62 is surrounded by a drum 68 similar to the drum 12, and the drum 68 is provided with an elongated discharge orifice 69 positioned so that fluid discharged therefrom will impinge the blades of the rotor 63. In this design, the drum 68 is pivotally mounted in a housing 70 and the position thereof is controlled by a rod 71 attached to the drum at the point 72 and provided with a button 73 at the outer end. With the rod 71, the drum 68 may be actuated whereby the orifice 69 may discharge fluid against the blades of the rotor 63 either above or below the center, wherein the rotor may be rotated in either a clockwise or counter-clockwise direction. By this means, a vehicle driven through the fluid transmission may be driven ahead or in reverse by actuation of the drum 68 by the rod 71. The shaft 66 may extend at both sides, as illustrated in Figure 6 so that either the rear or front wheels of a motor vehicle may be positioned on the ends thereof, and the vehicle may be driven forward or backward as desired. The shaft 64 of the rotor 62 extends through one side of the casing, and the end thereof is provided with a gear 74 that meshes with a gear 75 on a shaft 76 that may extend from an engine, motor, or the like.

The rod 71 extends through an opening 77 in the housing 70, and the side of the opening may be provided with projections 78 and 79, providing notches in which the rod may be held. It will be understood that this rod and the method of holding the rod in different positions are substantially diagrammatically illustrated, and these parts or the association thereof with the transmission may be modified as desired.

The fluid transmission of this invention, therefore, includes a power driven rotor, generally referred to as the driving rotor, and a driven rotor, with the rotors assembled in a common housing, and with the driving rotor encased in a drum with an elongated discharge orifice at one side, through which fluid pumped by the blades of the driving rotor is discharged to impinge the blades of the driven rotor. The driving rotor may be geared or otherwise connected to an engine, motor, or the like, and the driven rotor may be connected to the drive shaft of a motor vehicle or to any suitable machine or device desired. The speed of the driving elements is directly controlled by the speed of the engine or motor actuating the power or driving rotor. The vehicle or machine may be reversed by suitable gearing, as illustrated in Figure 2, or by shifting the position of the discharge orifice, as illustrated in Figure 5.

While a preferred specific embodiment of the invention is hereinbefore set forth, it is to be clearly understood that the invention is not to be limited to the exact construction illustrated and described because various modifications of the details may be provided in putting the invention into practice within the purview of the appended claims.

What is claimed is:

1. In a fluid transmission device, the combination, which comprises a driving rotor having blades in the periphery thereof, a driven rotor also having blades in the periphery thereof, a drum shaped casing surrounding the driving rotor and being provided with an elongated discharge orifice in its periphery wherein liquid discharged therefrom impinges the blades of the driven rotor, said drum shaped casing being rotatably adjustable to vary the position of said discharge orifice relative to the blades of said driven rotor, a housing enclosing said rotors, a liquid in said housing, said driving rotor and casing being partially immersed in said liquid while said driven rotor is disposed above the level of said liquid, the immersed portion of said casing being formed with inlet passages, means rotatably mounting the rotors in the housing, means connecting the driving rotor to a source of power, and means connecting the driven rotor to an operative element.

2. In a fluid transmission device, the combination, which comprises a driving rotor having blades in the periphery thereof, a driven rotor also having blades in the periphery thereof, a drum shaped casing surrounding the driving rotor and being provided with an elongated discharge orifice in its periphery wherein liquid discharged therefrom impinges the blades of the driven rotor, means shifting the position of said discharge orifice to change the direction of rotation of the driven rotor, a housing enclosing said rotors, a liquid in said housing, said driving rotor and casing being partially immersed in said liquid while said driven rotor is disposed above the level of the liquid, the immersed portion of said casing being formed with inlet passages, means rotatably mounting the rotors in the housing, means connecting the driving rotor to a source of power, and means connecting the driven rotor to an operative element.

3. In a fluid transmission device, the combination, which comprises a driving rotor having blades in the periphery thereof, a driven rotor also having blades in the periphery thereof, a drum shaped casing surrounding the driving rotor and being provided with an elongated discharge orifice in its periphery wherein liquid discharged therefrom impinges the blades of the driven rotor, said drum shaped casing being rotatably adjustable to vary the position of said orifice relative to the blades of said driven rotor, a housing enclosing said rotors, a liquid in said housing, said driving rotor and casing being partially immersed in said liquid while said driven rotor is disposed above the level of the liquid, the immersed portion of said casing being formed with inlet passages, an operating member connected to said drum shaped casing and extending through said housing, means rotatably mounting the rotors in the housing, means connecting the driving rotor to a source of power, and means connecting the driven rotor to an operative element.

4. In a fluid transmission, the combination, which comprises a driving rotor having a plurality of radially extending blades, a driven rotor of a comparatively smaller diameter having a plurality of radially extending blades, a casing surrounding the driving rotor and spaced from the ends of the blades thereof, said casing having a discharge orifice positioned adjacent the driven rotor, said casing having openings in the lower side thereof, said casing being rotatably adjustable to vary the position of said orifice relative to the blades of said driven rotor, a housing enclosing the rotors and casing, a liquid in said housing, said driving rotor and casing being partially immersed in said liquid while said driven rotor is disposed above the level of said liquid, an operating member having one end connected to said casing and passing through an opening in said housing, a shaft upon which the driving rotor is fixedly mounted, means rotatably mounting the shaft of the driving rotor in the housing with one end extending therefrom, a shaft upon which the driven rotor is fixedly mounted, and means rotatably mounting the shaft of the driven rotor in the housing with the shaft extending from the housing.

DAVID B. ALEXANDER.

REFERENCES CITED

The following references are of record in the file of this patent:

UNITED STATES PATENTS

| Number | Name | Date |
|---|---|---|
| 203,340 | Herr | May 7, 1878 |
| 1,078,710 | Weir | Nov. 18, 1913 |
| 1,141,812 | Michell et al. | June 1, 1915 |
| 1,384,511 | Buckendale | July 12, 1921 |
| 2,069,360 | Duffield | Feb. 2, 1937 |
| 2,379,164 | Larsen | June 26, 1945 |

FOREIGN PATENTS

| Number | Country | Date |
|---|---|---|
| 612,938 | France | Nov. 4, 1926 |